Dec. 19, 1961 K. TARDEL 3,014,143
COMPOUND GENERATOR
Filed Nov. 13, 1957 2 Sheets-Sheet 1

INVENTOR.
Kurt Tardel
BY
Michael S. Striker
Attorney

Dec. 19, 1961
K. TARDEL
3,014,143
COMPOUND GENERATOR
Filed Nov. 13, 1957
2 Sheets-Sheet 2
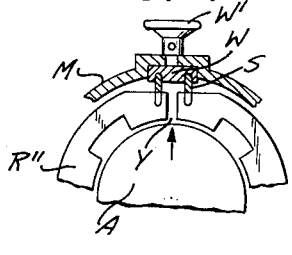
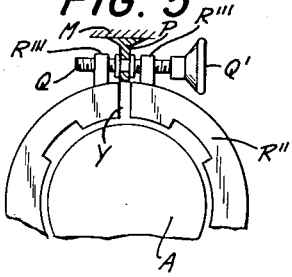
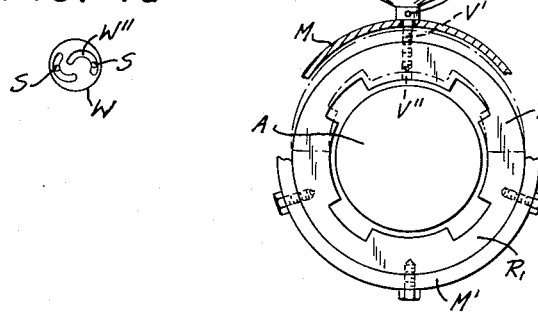
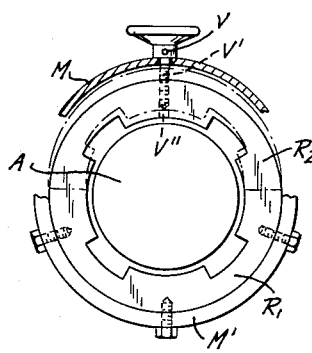
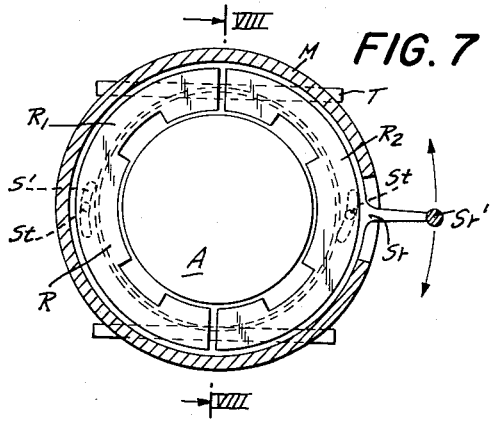
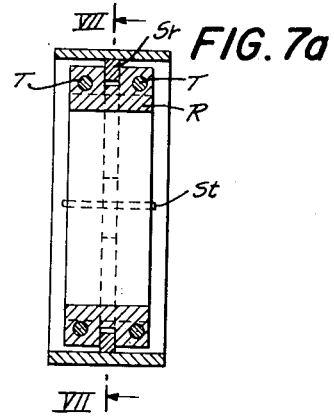
INVENTOR.
Kurt Tardel
BY
Michael S. Striker
Attorney

United States Patent Office 3,014,143
Patented Dec. 19, 1961

3,014,143
COMPOUND GENERATOR
Kurt Tardel, Rotenhauserweg 47, Osterode (Harz), Germany
Filed Nov. 13, 1957, Ser. No. 696,089
14 Claims. (Cl. 310—191)

The present invention refers to electric machines and more particularly to electric generators, and especially to constant-potential compound generators.

The main object of this invention is to overcome certain disadvantages encountered in the construction and operation of conventional generators of the type set forth.

Constant-potential generators, particularly those having external poles, are known in which the three-phase or other alternating current produced therein is introduced into an auxiliary winding to excite there a field in proportion thereto. This field, in turn, serves to generate in a D.C. winding arranged on the exciter armature a corresponding excitement required for the load, while the no-load excitement is generated by the main field of the main generator at the terminal ends of said D.C. winding in conductor means which extend through the main armature.

A drawback of this basic arrangement consists in the fact that the proportion between no-load excitement and load excitement cannot be changed. However, it is frequently quite desirable in practical operation to be able to produce such a change of the compounding characteristics because it may be desired to compensate for a drop of speed of the driving machine, or it may be necessary to make an adjustment in the case of a run in parallel with other generators. Therefore, it has been proposed to provide a separate exciter circuit for the load excitement which was applied to a second collector. In this case, it is possible to regulate the no-load potential and the degree of compounding by means of two separate and mutually independent resistors. However, such an arrangement with two separate exciter circuits entails a disadvantage with respect to the above mentioned arrangement because the whole structure and its operation as well as its production are far more complicated.

It is an object of this invention, therefore, to eliminate the complications caused by the use of two separate exciter circuits and to provide means for steplessly changing the compounding characteristics in a simple manner.

With above objects in view one embodiment of the invention mainly comprises a constant-potential compound generator which includes a compounding exciter armature, a substantially annular member surrounding it as a part of its magnetic circuit and separated therefrom in radial direction by a substantially annular air gap, and means for changing the magnetic reluctance in the magnetic circuit for the purpose of thereby changing the compounding characteristics of the generator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a fragmentary end view, partly in section, of a modification of the embodiment of FIG. 3;

FIG. 4a is a bottom view of one element of the embodiment of FIG. 4;

FIG. 5 is a fragmentary end view, partly in section, of another modification of the embodiment of FIG. 3;

FIG. 6 is a fragmentary end view, partly in section, of another embodiment of the invention;

FIG. 7 is an end view partly in section of a further embodiment of the invention, the section being taken along line VII—VII of FIG. 7a; and FIG. 7a is a cross-sectional view of the embodiment shown in FIG. 7, the section being taken along line VIII—VIII.

Figure 1:
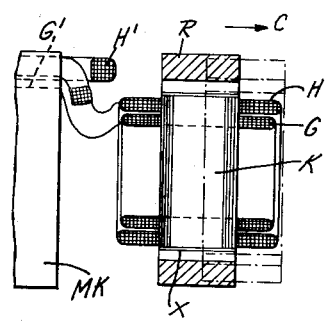
FIG. 1 is a diagrammatic, partly sectional elevation showing one embodiment of the invention.

FIG. 1 shows on the left side the end portion of the main armature MK of the generator, and on the right side the compounding exciter armature K arranged on the same axis. The three-phase or alternating current produced by external poles in the main winding H' of the main armature MK is introduced into the auxiliary winding means H and excites there a field proportional to the current flowing through the windings H, H', and depending on the load. This field, in turn, produces in a second auxiliary D.C. winding means G on the compounding armature K a corresponding excitement depending on the load. The terminal ends of D.C. winding means G are connected to conductor means G' shown on the left side of FIG. 1 to pass through the main armature MK. No-load excitement is created by the main field of the generator in the conductor means G'. The main armature MK, the winding H', and the conductor means G' are also provided in the embodiments shown in FIGS. 2 to 7, but are not shown in these figures for the sake of clarity and simplicity.

Figure 1A:
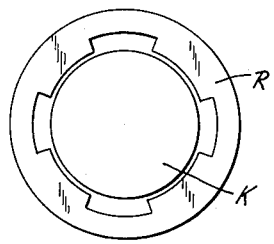
FIG. 1a is an end view of the structure shown in FIG. 1.
Figure 2:
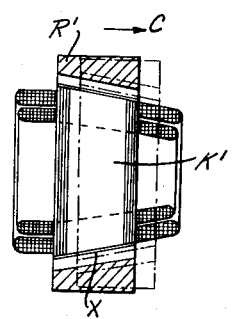
FIG. 2 is an elevation similar to that of FIG. 1 illustrating a modification of the first embodiment.

As shown in FIGS. 1 and 1a, the rotating armature K is surrounded by a not rotating annular member R which serves as a part of its magnetic circuit and is separated from the armature K in radial direction by a substantially annular air gap X. The annular member R is movable in axial direction with respect to the armature K, as indicated by the arrow C. By moving the member R in direction of arrow C for instance into the position shown by dotted lines, the compounding characteristics of the generator are changed because the magnetic flux is affected by the change of the position of member R with respect to the armature K. This also applies to FIG. 2: In the modified version of the just described embodiment the armature K' has a conical shape, and the annular member R' is shaped correspondingly conical on the inside. The member R' is similarly movable in direction of arrow C. However, in this case the magnetic flux is additionally modified by the fact that on account of the conical shape of armature and surrounding member the dimension of the air gap X in radial direction is materially increased already with a comparatively small axial movement of the annular member R'.

Figure 3:
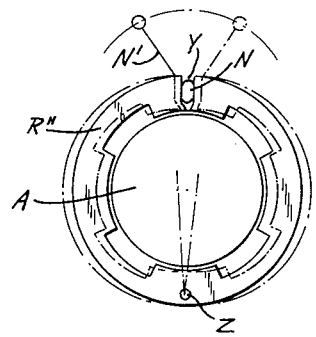
FIG. 3 is an end view of another embodiment of the invention.

FIGS. 3, 4 and 5 refer to an embodiment of the invention in which the annular member R'' is split at one selected point of its perimeter, and means are provided to deform the annular member by spreading it apart through the application of a force adapted to increase the dimension of the split. By deforming or spreading the annular member R'' again the dimension of the air gap in radial direction is changed more or less along the circumference of the armature A, but by all means at least in certain portions of the annular air gap.

In the embodiment illustrated by FIG. 3 the annular member R'' is supported at one point by a pin or pivot Z and is divided by a split Y at the point diametrally opposite from Z. A cam means N is interposed between the two ends of the member R'' within the split Y. When the cam means N is turned by swinging a control lever N' attached to the cam means N from the position shown in full lines into the position shown in dotted lines, the split Y is widened and thereby the air gap increased.

In the modification according to FIGS. 4 and 4a the housing M surrounding the member R'' carries a control member W which is turnable about an axis extending in radial direction with respect to the member R''. The control member W may have the shape of a disc as indicated by FIG. 4a, provided with two mutually symmetrical eccentric slots W'' which are respectively engaged by two pins S mounted respectively in each of the ends of the split apart portions of the annular member R''. When the control member W is turned by means of a handle W' the engagement of the pins S with the slots or grooves W'' results in a cam action which spreads the annular member R'' apart in the same manner and with the same effect as described above.

FIG. 5 shows a further modification in which each end of the split portions of the annular member R'' is provided with a lug R'''. The two lugs R''' have co-axial threaded holes, one having a left hand thread and the other one having a right hand thread. A threaded control means in the form of a left- and right-hand threaded spindle Q is placed in engagement with the threaded holes in the lugs R''' and is supported for rotation in a bearing P attached to the housing M. When the spindle Q is turned by means of the handle Q' the two lugs R''' are moved either towards each other or apart whereby the split Y and accordingly the angular air gap is changed.

FIG. 6 illustrates an embodiment in which the annular member is divided into two separate halves $R_1$ and $R_2$ of which the half $R_1$ is mounted stationarily in a member M' forming part of the housing structure, while the other half $R_2$ is movable in radial direction. For the purpose of moving the half $R_2$ the latter is provided with a threaded radial hole V'' which is engaged by a threaded control element V'. This in turn is supported for rotation about an axis extending in radial direction with respect to the armature A in a portion of the housing M. When the control element V' is turned by means of the knob V the half $R_2$ of the annular member is moved in radial direction whereby the dimension of the air gap is changed.

The embodiment illustrated by FIGS. 7 and 7a is also characterized by an annular member which is divided into two halves $R_1$ and $R_2$. However, in this case both halves are movable in radial direction along guide bars T. The guide bars T are supported in the housing M. An annular control member Sr is mounted in the housing M for rotation around the center of the armature A and can be controlled by a handle Sr' projecting through an opening in the housing M. The control member Sr is provided at two opposite points with eccentric slots S' which are in engagement with pins St mounted respectively in the two halves $R_1$ and $R_2$. When the control member Sr is turned in one or the other direction as indicated by arrows, the slots S' act like cams on the pins St whereby the two halves $R_1$ and $R_2$ are moved with respect to each other radially but in opposite directions. Hereby the radial dimension of the air gap is changed accordingly.

It will be understood that each of the elements described above, or two or more together, may also find a useful application in other types of electrical machines differing from the types described above.

While the invention has been illustrated and described as embodied in a constant-potential compound generator, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a constant potential compound generator, a main armature means having a main winding for producing alternating current, and conductor means adapted to be excited a compounding exciter armature; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an increased exciting current when said first auxiliary winding means receives current from said main winding under load conditions and excites said second auxiliary winding; a substantially annular axially movable member surrounding said armature as a part of its magnetic circuit and separated in radial direction from said armature by a substantially annular air gap; and means for changing the magnetic reluctance in said magnetic circuit by axially moving said annular member relative to said armature for the purpose of thereby changing the compounding characteristics of said generator.

2. In a constant-potential compound generator, a main armature means having a main winding for producing alternating current, and conductor means adapted to be excited a compounding exciter armature of conical outside shape; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an increased exciting current when said first auxiliary winding means receives current from said main winding under load conditions and excites said second auxiliary winding; a substantially annular axially movable member of correspondingly conical inside shape surrounding said armature as a part of its magnetic circuit and separated in radial direction from said armature by a substantially annular air gap; and means for changing the magnetic reluctance in said magnetic circuit by axially moving said annular member relative to said armature and thus changing the radial dimension of said air gap for the purpose of thereby changing the compounding characteristics of said generator.

3. In a constant-potential compound generator, a main armature means having a main winding for producing alternating current, and conductor means adapted to be excited a compounding exciter armature; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an increased exciting current when said first auxiliary winding means receives current from said main winding under load conditions and excites said second auxiliary winding; a substantially annular member surrounding said armature as a part of its magnetic circuit and separated in radial direction from said armature by a substantially annular air gap, said annular member being divided by a split at least at one point of its perimeter into at least two portions; and means for changing the magnetic reluctance in said magnetic circuit by moving, through changing the dimension of said split, at least one portion of said annular member with respect to the rest thereof and thus changing the radial dimension of at least a corresponding part of said annular air gap for the purpose of thereby changing the compounding characteristics of said generator.

4. In a constant-potential compound generator, a main armature means having a main winding for producing alternating current, and conductor means adapted to be excited a compounding exciter armature; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an increased exciting current when said first auxiliary winding means receives current from said main winding under load conditions and excites said second auxiliary winding; a substantially annular member surrounding said armature as a part of its magnetic circuit and separated in radial direction from said armature by a substantially annular air gap, said annular member being divided by a split at least at one point of its perimeter into at least two portions; and means for changing the magnetic reluctance in said magnetic circuit by moving, through changing the dimension of said split, at least one portion of said annular member with respect to the rest thereof and thus changing the radial dimension of at least a corresponding part of said annular air gap for the purpose of thereby changing the compounding characteristics of said generator, said means including turnable cam means interposed between said portions of said annular member at said point of split for changing the dimension of said split by turning said cam means.

5. In a constant-potential compound generator, a main armature means having a main winding for producing alternating current, and conductor means adapted to be excited a compounding exciter armature; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an increased exciting current when said first auxiliary winding means receives current from said main winding under load conditions and excites said second auxiliary winding; a substantially annular member surrounding said armature as a part of its magnetic circuit and separated in radial direction from said armature by a substantially annular air gap, said annular member being divided by a split at least at one point of its perimeter into at least two portions; and means for changing the magnetic reluctance in said magnetic circuit by moving, through changing the dimension of said split, at least one portion of said annular member with respect to the rest thereof and thus changing the radial dimension of at least a corresponding part of said annular air gap for the purpose of thereby changing the compounding characteristics of said generator, said means including a turnable control member mounted outside said annular member and having an axis extending in a radial plane of said annular member at said point of split, and eccentric engagement means on said control member in a plane of rotation thereof, and actuating elements projecting respectively from each of said portion of said annular member at opposite sides of said split thereof and being in engagement with said eccentric engagement means, so that the dimension of said split is changed when said control member is turned.

6. In a constant-potential compound generator, a main armature means having a main winding for producing alternating current, and conductor means adapted to be excited a compounding exciter armature; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an increased exciting current when said first auxiliary winding means receives current from said main winding under load conditions and excites said second auxiliary winding; a substantially annular member surrounding said armature as a part of its magnetic circuit and separated in radial direction from said armature by a substantially annular air gap, said annular member being divided by a split at least at one point of its perimeter into at least two portions; and means for changing the magnetic reluctance in said magnetic circuit by moving, through changing the dimension of said split, at least one portion of said annular member with respect to the rest thereof and thus changing the radial dimension of at least a corresponding part of said annular air gap for the purpose of thereby changing the compounding characteristics of said generator, said means including threaded control means turnably mounted adjacent to said split of said annular member, and engagement members mounted respectively on each of said portions of said annular member at opposite sides of said split thereof and being in engagement with said threaded control means, at least one of said members being in threaded engagement, so that the dimension of said split is changed when said threaded control means is turned.

7. In a constant-potential compound generator, a main armature means having a main winding for producing alternating current, and conductor means adapted to be excited a compounding exciter armature; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an increased exciting current when said first auxiliary winding means receives current from said main winding under load conditions and excites said second auxiliary winding; a substantially annular member surrounding said armature as a part of its magnetic circuit and separated in radial direction from said armature by a substantially annular air gap, said annular member being divided into at least two portions and means for changing the magnetic reluctance in said magnetic circuit by moving at least one portion of said annular member with respect to the rest thereof in radial direction thereof and thus changing the radial dimension of at least a corresponding part of said annular air gap for the purpose of thereby changing the compounding characteristics of said generator, said means including a control element supported in a stationary part of said generator and engaging said one portion of said annular member, said control element being movable with respect to said stationary part for changing the distance of said one portion of said annular member from said stationary part.

8. In a constant-potential compound generator, a main armature means having a main winding for producing alternating current, and conductor means adapted to be excited a compounding exciter armature; first auxiliary winding means on said compounding exciter armature and connected to said main winding for receiving from the same alternating current under load conditions; a direct current second auxiliary winding means on said compounding exciter armature, associated with said first auxiliary winding means and being connected to said said conductor means to supply to the same an increased exciting current when said first auxiliary winding means receives current from said main winding under load conditions and excites said second auxiliary winding; a substantially annular member surrounding said armature as part of its magnetic circuit and separated in radial direction from said armature by a substantially annular air gap, said annular member being divided into at least two portions, each of said portions being supported for sliding movement in radial direction thereof; and means for changing the magnetic reluctance in said magnetic circuit by simultaneously moving each of said portions of said annular member in radial direction thereof and thus changing the radial dimension of at least a corresponding part of said annular air gap for the purpose of thereby changing the compounding characteristics of said generator.

9. In a constant-potential compound generator, a main armature means having a main winding for producing alternating current, and conductor means adapted to be excited a compounding exciter armature; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an increased exciting current when said first auxiliary winding means receives current from said main winding under load conditions and excites said second auxiliary winding; a substantially annular member surrounding said armature as a part of its magnetic circuit and separated in radial direction from said armature by a substantially annular air gap, said annular member being divided into at least two portions, each of said portions being supported for sliding movement in radial direction thereof; and means for changing the magnetic reluctance in said magnetic circuit by simultaneously moving each of said portions of said annular member in radial direction thereof and thus changing the radial dimension of at least a corresponding part of said annular air gap for the purpose of thereby changing the compounding characteristics of said generator, said means including a turnable control ring mounted adjacent to said annular member and have eccentric cam portions in engagement with corresponding portions of said portions of said annular member, respectively, so that by turning said control ring said portions of said annular member are moved in radial direction.

10. In a constant-potential compound generator, in combination, a main armature means having a main winding for alternating current, and conductor means adapted to be excited; a compounding exciter armature connected to said main armature for rotation therewith; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an additional exciting current when said first auxiliary winding means receives current from said main winding under load conditions and excites said second auxiliary winding means; a magnetically conductive member without a magnetic field of its own, located adjacent said compounding exciter armature and forming part of its magnetic circuit and being separated from the same by an air gap; and means for varying said air gap whereby the magnetic reluctance in the magnetic circuit of said exciter armature and the compounding characteristics of the generator are changed.

11. In a constant-potential compound generator, in combination, a main armature means having a main winding for alternating current, and conductor means adapted to be excited; a compounding exciter armature connected to said main armature for rotation therewith; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an additional exciting current when said first auxiliary winding means receives current from said main winding under load conditions and excites said second auxiliary winding means; a magnetically conductive member without a magnetic field of its own, located adjacent said compounding exciter armature and at least partly surrounding the same so as to form part of its magnetic circuit and being separated from the same by an air gap; and means for moving at least a part of said member relative to said compounding exciter armature for varying said air gap whereby the magnetic reluctance in the magnetic circuit of said exciter armature and the compounding characteristics of the generator are changed.

12. In a constant-potential compound generator, in combination, a main armature means having a main winding for alternating current, and conductor means adapted to be excited; a compounding exciter armature connected to said main armature for rotation therewith; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an additional exciting current when said first auxiliary winding means receives current from said main winding under load conditions and excites said second auxiliary winding means; a magnetically conductive member without a magnetic field of its own, located adjacent said compounding exciter armature and at least partly surrounding the same so as to form part of its magnetic circuit and being separated from the same by an air gap; and means for moving said member in axial direction relative to said compounding exciter armature for varying said air gap whereby the magnetic reluctance in the magnetic circuit of said exciter armature and the compounding characteristics of the generator are changed.

13. In a constant-potential compound generator, in combination, a main armature means having a main winding for alternating current, and conductor means adapted to be excited; a compounding exciter armature connected to said main armature for rotation therewith; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an additional exciting current when said first auxiliary winding means receives current from said main winding under load conditions and excites said second auxiliary winding means; a magnetically conductive member without a magnetic field of its own, located adjacent said compounding exciter armature and at least partly surrounding the same so as to form part of its magnetic circuit and being separated from the same by an air gap; and means for moving said member in direction transverse to the axis of rotation of said compounding exciter armature relative to said compounding exciter armature for varying said air gap whereby the magnetic reluctance in the magnetic circuit of said exciter armature and the compounding characteristics of the generator are changed.

14. In a constant-potential compound generator, in combination, a main armature means having a main winding for alternating current, and conductor means adapted to be excited; a compounding exciter armature connected to said main armature for rotation therewith; first auxiliary winding means on said compounding exciter armature and connected to said main winding for receiving from the same alternating current under load conditions; a direct current second auxiliary winding means on said compounding exciter armature, associated with said first auxiliary winding means and being connected to said conductor means to supply to the same an additional exciting current when said first auxiliary winding means receives current from said main winding under load conditions and excites said second auxiliary winding means; a magnetically conductive non-rotating member without a magnetic field of its own, located adjacent said compounding exciter armature and at least partly surrounding the same so as to form part of its magnetic circuit and being separated from the same by an air gap; and means for moving at least a part of said member relative to said compounding exciter armature for varying said air gap whereby the magnetic reluctance in the magnetic circuit of said exciter armature and the compounding characteristics of the generator are changed.

References Cited in the file of this patent
UNITED STATES PATENTS

| | | |
|---|---|---|
| 263,134 | Edison | Aug. 22, 1882 |
| 782,340 | Hubbard | Feb. 14, 1905 |
| 2,207,304 | Rosenberg | July 9, 1940 |
| 2,625,674 | Petit | Jan. 13, 1953 |